United States Patent [19]

Klepsch et al.

[11] Patent Number: 5,009,952

[45] Date of Patent: Apr. 23, 1991

[54] INSULATING WALL FOR REFRIGERATOR DEVICES

[75] Inventors: Wilhelm Klepsch; Dietmar Plöbst, both of Kaprun, Austria

[73] Assignee: Senoplast Klepsch & Co., Kaprun, Austria

[21] Appl. No.: 572,056

[22] Filed: Aug. 23, 1990

[51] Int. Cl.$^5$ .................... F25D 23/08; B32B 5/20; B32B 7/04
[52] U.S. Cl. ................................ 428/319.1; 220/444; 220/467; 312/214; 428/319.3; 428/319.7
[58] Field of Search ................ 220/444, 467; 312/214; 428/319.1, 319.3, 319.7

[56] References Cited

U.S. PATENT DOCUMENTS 4,196,950  4/1980  Churchill et al. ............... 312/214
4,707,401  11/1987  Benford .......................... 220/444

Primary Examiner—William J. Van Balen
Attorney, Agent, or Firm—Lorusso & Loud

[57] ABSTRACT

An insulating wall for refrigerator devices, wherein a polyurethane is foamed between an exterior metal sheet and a deep-drawn plastics material plate selected from a member of the group of polystyrole or acrylonitrile-butadiene-styrene, wherein the cell-gas of the polyurethane foam is carbon dioxide and wherein the plastics material plate comprises in its interior a blocking layer of 0.03–0.6 mm thickness formed of a copolymer of polyethylene and vinyl alcohol where the molar percent of polyethylene in the copolymer is in the range of 32–44.

2 Claims, 1 Drawing Sheet

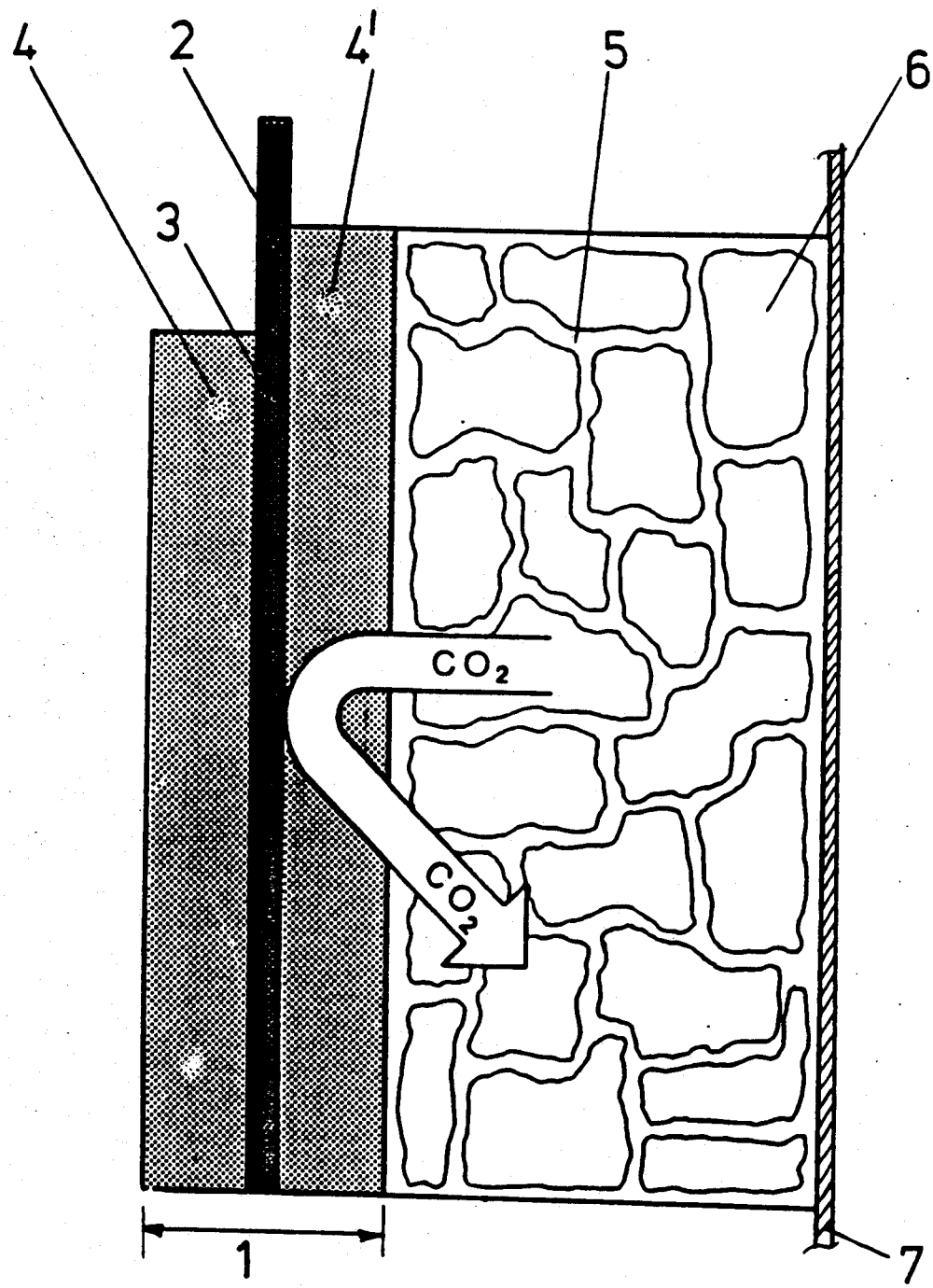

INSULATING WALL FOR REFRIGERATOR DEVICES

The invention relates to an insulating wall for refrigerator devices, wherein a polyurethane is foamed between an exterior metal sheet and a deep-drawn plastics material plate selected from a member of the group of polystyrole or ABS.

At present, a fluoro hydrocarbon (FCKW), as e.g. Freon, is used as a foaming agent for the polyurethane foam. For reasons of environmental protection, the use of FCKW should be stopped as soon as possible, as the well-known "hot-house-effect" results therefrom. From 1995 onwards, the use of FCKW for producing polyurethane foam will no longer be permitted. When ceasing from the use of Freon as foaming agent, the problem arises that a polyurethane foam with air a cell-gas has a $\lambda$-value which lies between 28 and 33 watts $\cdot 10^{-3}$/mK, whereas the corresponding value of the heat-transfer coefficient $\lambda$ is about 18 for a polyurethane foam using Freon R11 as foaming agent. A solution of this problem follows from the use of water as a foaming agent, as this results in the generation of $CO_2$ as cell-gas. The $\lambda$-value of the resulting polyurethane foam is 24.

Examinations of polyurethane foam with $CO_2$ as cell-gas showed a gradual deterioration of thermal insulation characteristics, this deterioration being due to $CO_2$ diffusing outwardly and being replaced by air. In order to be able to use foams with $CO_2$ as cell-gas for the manufacture of insulating walls of refrigerator devices, a way has to be found to make the deep-drawn plate confining the foam impermeable to $CO_2$.

Even if it is known per se that copolymers of ethylene vinyl alcohol are well suited as blocking layers, their use in the present context, however, was not obvious, as the coextrusion of these plastics materials with polystyrole or ABS turned out to be difficult. Finally, the difficulties could be overcome by a careful control of the polyethylene percentage in the copolymer.

Thus, according to the invention, it is provided with a insulating wall set forth at the beginning, that the cell-gas of the PU-foam is $CO_2$ and that the plastics material plate comprises in its interior a blocking layer of 0.03–0.6 mm thickness formed of a copolymer of polyethylene and vinyl alcohol (EVOH) where the molar percent of polyethylene in the copolymer is in the range of 32–44.

A bond of the EVOH-layer with the adjacent polymers, polystyrole, ABS or the like is preferably possible by using an extrudable adhesion agent containing vinyl acetate, whereby the plastics material plate finally consists of 5 to 6 polymer layers.

BRIEF DESCRIPTION OF THE DRAWING

Further details of the invention are explained subsequently with the aid of the drawing showing a section (not in correct scale) through a wall for refrigerator devices according to the invention.

The insulating wall shown substantially consists of a polyurethane foam layer that is foamed between the plastics material plate 1 and the exterior metal sheet 7 of the device. The cell-gas of the polyurethane foam is $CO_2$ that is formed as a chemical reaction with isocyanate when water is used as a foaming agent for the manufacture of the polyurethane foam. It is present within the cells 6, the cell-walls 5 of which are formed by polyurethane. Inter alia, it is the purpose of the plate 1 to prevent the exchange of the carbon dioxide in the cells 6 for air. To this end, an ethylene vinyl alcohol blocking layer 2 having a thickness of 0.03–0.6 mm, preferably about 0.3 mm, is arranged between two polystyrole- or ABS-layers 4,4'. Said ethylene vinyl alcohol is a crystalline polymer, the molecular structure of which is given by the following formula:

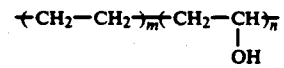

The coextrusion with the partial plates 4,4' of polystyrole or ABS led to good results, if the molar percent of polyethylene was between 32 and 44, and the melting index (MFI) had values between 2 and 8 at 210° C. (the data refer to a measuring period of 10 minutes and the load by the weight of a mass of 2160 g). The quality of the plate 1 could be improved by using very thin layers 3 of adhesion agents containing vinyl acetate, the MFI of which lay between 3 and 4, as measured at 190° C.

We claim:

1. An insulating wall for refrigerator devices, wherein a polyurethane is foamed between an exterior metal sheet and a deep-drawn plastics material plate selected from a member of the group of polystyrole or acrylonitrile-butadiene-styrene, characterized in that the cell-gas of the polyurethane foam is carbon dioxide and that the plastics material plate comprises in its interior a blocking layer of 0.03–0.6 mm thickness formed of a copolymer of polyethylene and vinyl alcohol where the molar percent of polyethylene in the copolymer is in the range of 32–44.

2. The plastics material plate according to claim 1, characterized in that the ethylene vinyl alcohol layer is connected to the adjacent polystyrole or acrylonitrile-butadiene-styrene via an adhesion agent containing vinyl acetate.

* * * * *